Nov. 5, 1963   J. S. FINGER   3,109,763
METHOD AND APPARATUS FOR FORMING A FIBER REINFORCED RESIN PANEL
Filed Sept. 20, 1955   3 Sheets-Sheet 3

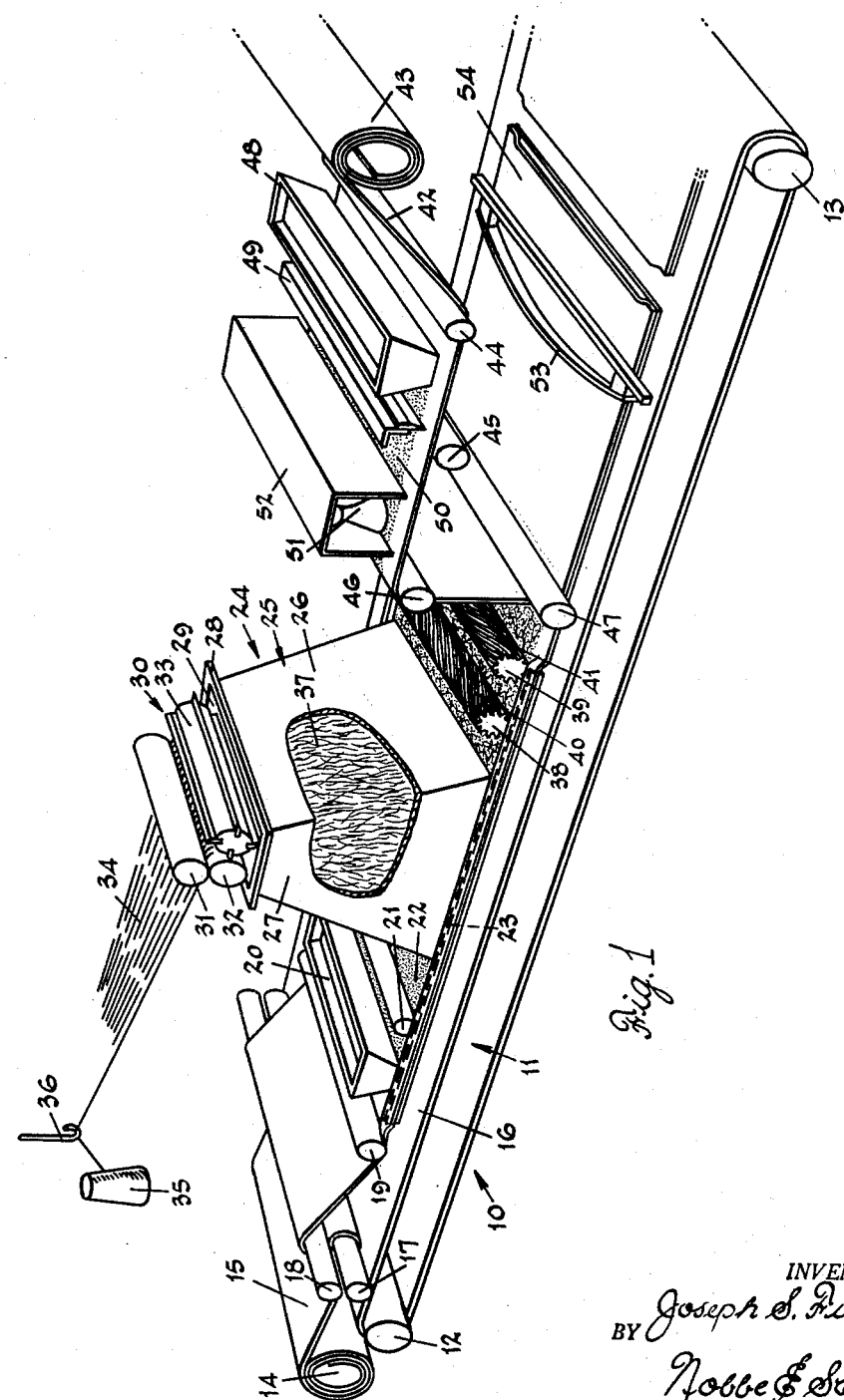

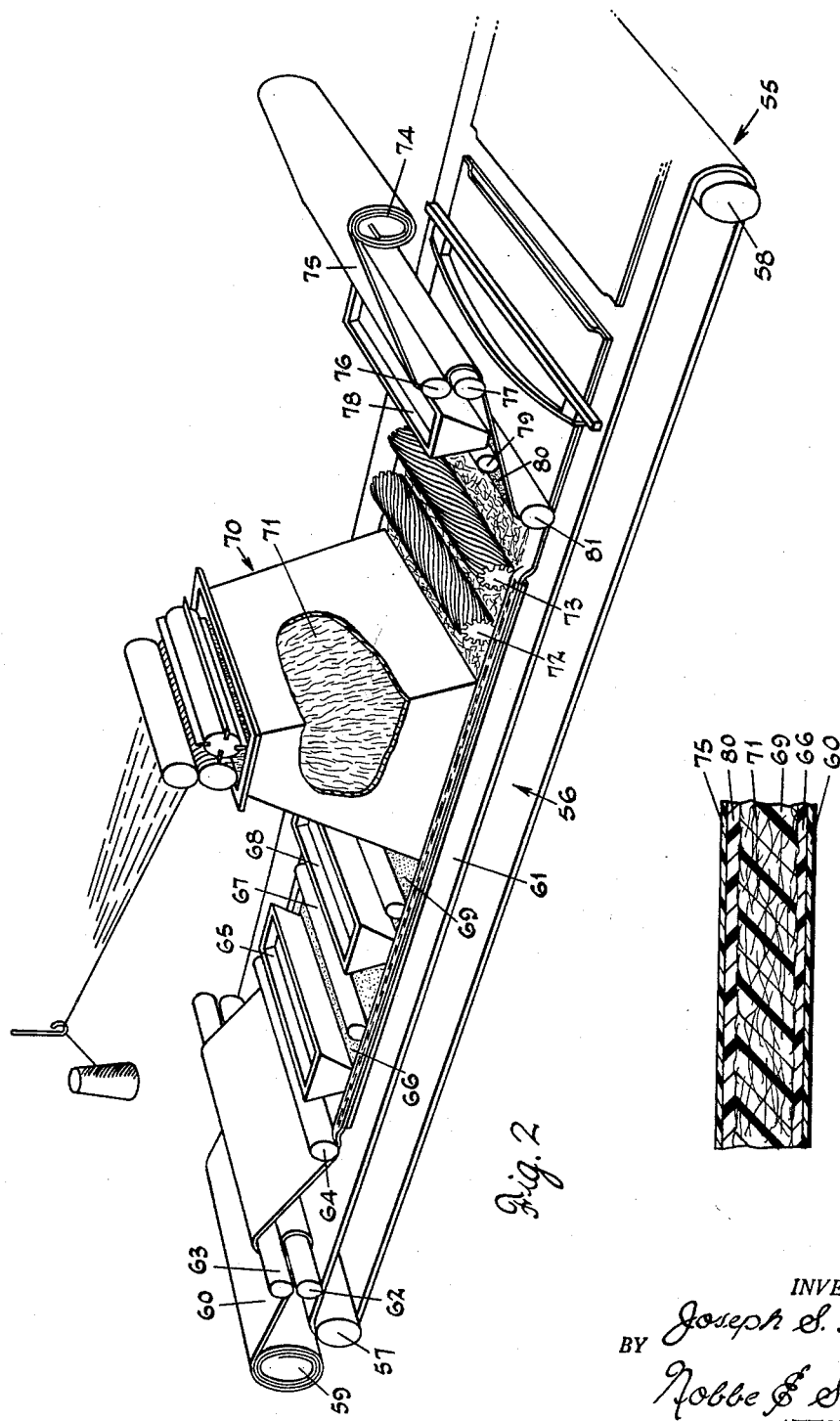

INVENTOR.
Joseph S. Finger
BY
Nobbe & Swope
ATTORNEYS

United States Patent Office 3,109,763
Patented Nov. 5, 1963

3,109,763
METHOD AND APPARATUS FOR FORMING A
FIBER REINFORCED RESIN PANEL
Joseph S. Finger, Bellaire, Tex., assignor, by mesne assignments, to Johns-Manville Fiber Glass Inc., Cleveland, Ohio, a corporation of Delaware
Filed Sept. 20, 1955, Ser. No. 535,385
14 Claims. (Cl. 156—276)

This invention relates broadly to synthetic resin articles of manufacture and to processes of making the same.

In a further aspect this invention relates to synthetic resin panels having surfaces of improved weather resistance.

In a still further aspect, this invention relates to reinforced synthetic resin panels provided with resin rich surfaces molecularly bonded to the core material to form an integral product, whereby increased resistance to weathering and surface erosion are imparted to the panels.

In another aspect, this invention relates to a method for producing reinforced synthetic resin panels having improved weather and erosion resistance.

In another aspect, this invention relates to a decorative panel of reinforced synthetic resin wherein a colored coating is combined with a different colored core and these two materials are intermixed at the interface to produce a decorative finish.

In still another aspect, this invention relates to a reinforced synthetic resin panel having a weather resistant coating of controlled crinkle contour applied to a surface thereof.

Various thermosetting resins such as the polyesters and alkyds, the phenol-formaldehydes, alkyd-silicones, and others can be combined with suitable reinforcing materials and formed into panels for various uses. Such uses include skylights in buildings, awnings, wall and ceiling panels and others.

One method now practiced in the art of manufacturing such panels, comprises placing a thin pliable film, such as regenerated cellulose (known in the trade as cellophane) upon a flat, level forming surface. An interlayer comprising a thermosetting resin containing a suitable reinforcement such as chopped glass fibers, is then positioned upon the pliable film. A second pliable film is subsequently positioned upon the resin interlayer and the "sandwich" thus produced is subjected to a curing operation. The pliable films are then removed, and after trimming to size the panels thus produced are ready for commercial use.

In these prior panels, some of the reinforcing fibers lie very close to the surface and are covered only by an extremely thin film of resin. Such thin, resin films are subject to comparatively rapid attack by sun, rain, wind and dust and are thus worn away to expose the reinforcing fibers. The result is that the fibers are eroded and weathered and the surfaces of the panels become discolored and worn, reducing light transmission through the panels.

I have found that if a film of resin is applied to the surface of a panel, made in accordance with the method of the prior art, that weather and erosion resistance are increased remarkably. Even more important, the extra resin covering preserves the relationship of the indexes of refraction in a manner suitable for transmission of light. As long as the fibrous glass is embedded in a resin with substantially the same index of refraction, the light will continue to pass through the panel. But if the resin no longer covers the glass fiber, the index of refraction becomes that of glass to air, in which case light is reflected from the surface of the glass fiber instead of being transmitted through the panel. I have found that a panel which has been eroded to the extent that the fibers are exposed to the air and the light transmission greatly reduced can be resurfaced with a film of clear resin of the proper type and thus restore from 35% to 50% of the lost light transmission. The problem, however, is to apply such films or coatings in an economical and uniform manner. It has not been practical to cast such films on a laminate because the shrinkage of the resin on curing leaves cracks and crazed spots. The only method now known to be feasible for casting films is to use an extended cure time to prevent the crazing, i.e., to cure the films extremely slowly or to modify the resins at the expense of weather resistance. This is impractical and uneconomical in mass production operations.

Another method of applying surface films to which I have given consideration, has included the use of a thin veil of fibrous glass surfacing mat to hold the surface film of resin in place. However, due to the expense of these fiber glass veils and the added resin, such procedure has priced the resulting panels out of the competitive market. Furthermore, it is difficult to remove the air caught between the veil and the core stock.

Accordingly, it is an object of the present invention to provide synthetic resin panels having surfaces of improved weather and erosion resistance and which will maintain the proper relationship of indexes of refraction between the panel surfaces and air for maximum light transmission through the panels.

Another object of the invention is to provide reinforced synthetic resin panels having integrally formed films of resin on the surfaces thereof, whereby increased erosion and weather resistance are imparted to the panels and which will maintain the proper relationship of indexes of refraction between the panel surfaces and air for maximum light transmission through the panels.

Another object is to provide a method for producing reinforced synthetic resin panels having improved weathering and erosion resistance, and which have the proper relationship of indexes of refraction between the panel surfaces and air for maximum light transmission through the panels.

A further object of the present invention is to provide a method for the production of reinforced synthetic resin panels having integrally formed films of resin on the surfaces thereof, whereby increased erosion and weather resistance are imparted to the panels.

A still further object of the invention is to provide a method for the production of reinforced synthetic resin panels having surfaces of pure or unfilled resin, wherein such surfaces are formed as integral parts of the panels during formation thereof.

Other objects and advantages of the invention will become more apparent during the course of the following description when taken in connection with the accompanying drawings.

In the drawings, wherein like numerals are employed to designate like parts throughout the same:

FIG. 1 is a perspective view of one embodiment of an apparatus adapted to produce panels in accordance with the present invention;

FIG. 2 is a perspective view of a second embodiment of an apparatus adapted to produce panels of improved finish in accordance with the present invention;

Figure 4:
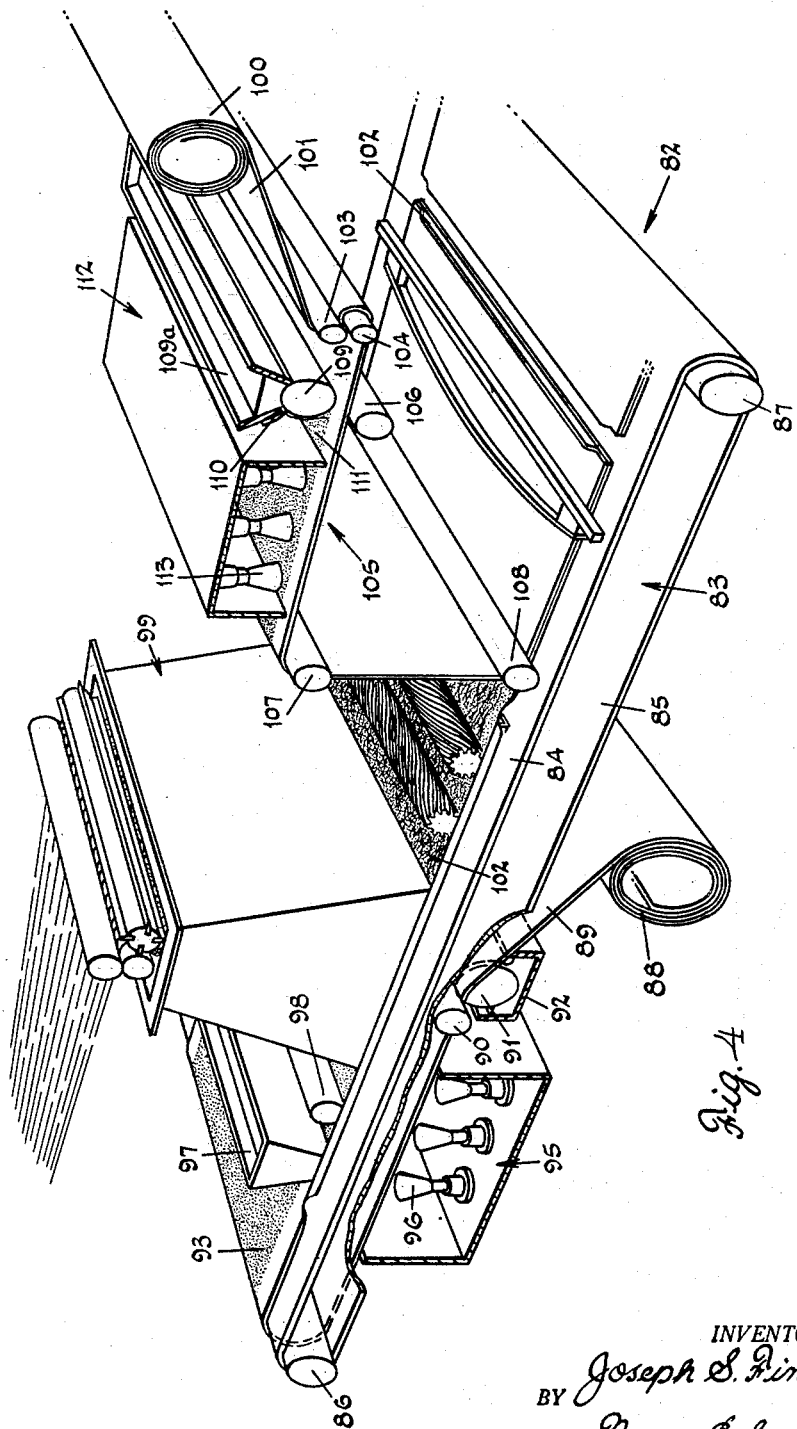

FIG. 3 is a sectional view of a panel made in accordance with the present invention, comprising an interlayer of reinforced synthetic resin having integrally formed surfaces of pure resin, and having temporary retaining films of plastic adhered to the surfaces, which films are employed during the fabrication operation; and FIG. 4 is a perspective view of a third embodiment of an apparatus adapted to produce panels in accordance with the present invention.

In accordance with the present invention a layer of thermosetting resin in liquid form is placed upon a thin pliable film, preferably formed of a thermoplastic, synthetic resin, or regenerated cellulose. A reinforcing filler such as chopped glass fibers is combined with the resin layer and a second pliable film with a thin film of thixotropic or very viscous resin applied thereto is placed on top of the resin layer and reinforcement mixture. The film encased assembly is thereafter placed on a suitable mold and cured to a hard solid state, whereby the resin rich surface becomes molecularly bonded to the core. The panels are subsequently trimmed to size, and with the pliable cover films stripped away, are ready for use.

As shown in FIG. 1, numeral 10 designates generally a machine for continuously producing reinforced synthetic resin panels by the wet lay up method. Machine 10 includes a continuous belt 11 suitably fabricated of reinforced rubber and movably mounted upon a pair of horizontally aligned and spaced rolls 12 and 13. At the left hand end of the machine 10 a roll 14 of pliable film such as cellophane is supported on an axis parallel to the axes of conveyor rolls 12 and 13 in a manner whereby the film 15 can be payed out and smoothly laid down upon the forward flight 16 of belt 11 in a continuous manner. The feeding mechanism for the film 15 includes a pair of vertically spaced rolls 17 and 18 mounted transversely of belt 11 and a third roll 19 similarly mounted and positioned forwardly of rolls 17 and 18. Roll 19 is in peripheral contact with flight 16 of belt 11. Film 15 is fed beneath roll 17, up and around roll 18 and then down beneath roll 19 and onto flight 16 of belt 11. A resin hopper 20 is positioned transversely of belt 11, in front of roll 19 and a short distance above flight 16 of belt 11. Resin hopper 20 comprises an elongated trough of a length equivalent to the width of belt 11 and is provided in its bottom with a series of spaced holes (not shown) through which a liquid thermosetting resin such as a polyester resin is flowed upon the film 15. A smooth and gauge roll 21 is positioned in front of hopper 20 and is adapted to spread the liquid resin evenly across film 15 and maintain a uniform layer 22 of resin moving forwardly. An elongated angle iron retainer 23 is positioned slightly above the edge of flight 16 of belt 11. A similar retainer member (not shown) is similarly positioned along the other edge of flight 16. The extreme edge of the film 15 rides on and is slightly elevated by retainer member 23 and with the other retainer member forms a shallow movable trough from film 15 for retaining the resin layer 22 on the belt 11.

A chopped fiber distributing unit 24 is positioned forwardly of roll 21 and is adapted to cut and uniformly distribute fibers upon and across the resin layer 22. Unit 24 includes an upstanding hood 25 having front and rear walls 26 of a width equal to the width of the resin layer 22. The side walls 27 taper upwardly in triangular fashion and converge to a horizontally disposed top plate 28 which is provided with an elongated opening 29. A cutter unit 30 is supported above the opening 29 and comprises a pair of peripherally engaging, vertically spaced feed rolls 31 and 32 and a rotatable knife carrier 33 adapted to engage the periphery of roll 32. A plurality of strands 34 are respectively fed from packages 35 through guides 36 and between the feed rolls 31 and 32, downwardly around roll 32 where they are cut into suitable lengths by the knife carrier 33. The chopped strands 37 fall through opening 29 and are spread over the resin layer 22. A pair of press rolls 38 and 39 are positioned forwardly of hood 25 and are provided respectively with left and right hand helical threads 40 and 41 which press the chopped strands 37 into the resin layer 22. Threads 40 and 41 of rolls 38 and 39 respectively force beads of resin back and forth across the resin layer 22, thoroughly wetting the chopped fibers 37 with resin and press the fibers into the liquid resin. Following the press rolls 38 and 39, the cover film 42 is applied. A roll 43 of sheet material such as the cellulose film previously described, is supported above flight 16 and is adapted to be rotated and pay out the film 42 in a uniform and continuous manner on top of the resin layer 22.

A horizontally disposed feed roll 44 is interposed in the path of film 42 to thereby guide such film in cooperation with subsequent rolls 45, 46 and 47 onto the top of the resin layer 22 in a smooth and uniform manner. A resin hopper 48, similar to the resin hopper previously described is provided above the film 42 for application of a thin layer of resin thereto. A doctor knife 49 is placed above and cooperates with feed roll 45 for uniformly spreading a very thin layer of resin 50 across the surface of the film 42. A bank of infra-red lamps 51, supported within a suitable fixture 52 is disposed above the progressing film 42 to heat and partially gel the resin layer 50 contained thereon to restrain its bleeding into the resin interlayer 22. The advancing film 42 then passes over feed roll 46, thence down and around feed roll 47 and is thereby laid upon the top of the resin 22, containing the chopped reinforcement material 37 therein. An arcuately shaped squeegee 53 is placed forwardly of roll 47 and is adapted to press and smooth the film 42 and thereby aids in the removal of bubbles of air which may have become entrained in the resin layer 22.

Machine 10 is thus adapted to continuously produce a wet resin lay up 54 having a chopped strand reinforcement 37 incorporated therein, such resin lay up having one surface of pure or unfilled resin positively covering the reinforcement fibers lying adjacent thereto to provide improved durability as described hereinbefore.

A second embodiment of the present invention is shown in FIG. 2 wherein apparatus is illustrated which is adapted to provide a layer of unfilled, thixotropic resin upon each of the surfaces of a synthetic resin panel containing a fibrous reinforcement material. The numeral 55 designates generally a machine for continuously producing reinforced synthetic resin panels by the wet lay up method. A continuous belt 56 suitably fabricated of reinforced rubber and movably mounted upon a pair of horizontally aligned and spaced rolls 57 and 58 provides a moving platform upon which the resin lay up is effected. At the left hand end of the machine 55 a roll 59 of pliable film is supported upon an axis parallel to the axes of conveyor rolls 57 and 58 in a manner whereby the film 60 can be payed out and smoothly laid down upon the forward flight 61 of continuous belt 56. The feeding mechanism for the film 60 includes vertically spaced rolls 62 and 63 mounted transversely of belt 56 and a third roll 64 similarly mounted and positioned forwardly of rolls 62 and 63. The components described to this point are essentially the same as those shown in the embodiment of FIG. 1. Roll 64 is in peripheral contact with flight 61 of belt 56. Film 60 is fed beneath roll 62, up and around roll 63 and then down beneath roll 64 and onto forward flight 61 of continuous belt 56. A first resin hopper 65 is positioned transversely of belt 56, in front of roll 64, and a short distance above the top surface of forward flight 61 of belt 56. The purpose of this resin hopper is to feed an extremely thin film 66 of thixotropic resin upon the pliable film 60. A doctor roll 67 is employed to smooth and gauge the resin film 66 to a carefully controlled and uniform thickness across film of plastic 60. Where, as described, a thixotropic resin is employed, heating means as shown in FIG. 1 may not be required. However, when employing a liquid resin, a heating unit for partially curing or gelling the film will be employed to prevent intermixing of the above mentioned thin film of resin with the subsequently applied interlayer of resin and fibrous reinforcement material. An embodiment incorporating such heating units will be subsequently described.

Reference numeral 68 indicates a resin hopper which is employed for the purpose of applying the main resin interlayer 69 upon the forwardly moving resin coated cover film 60. This resin hopper 68 is provided with a row of spaced feed holes (not shown) for feeding a layer of resin 69 upon the resin coated bottom film 60. The chopped fiber distributing unit 70 is the same as employed and described in the embodiment of FIG. 1 and deposits an evenly distributed layer of chopped strand 71 over the resin layer 69. A pair of coacting press rolls 72 and 73 press the chopped strands of reinforcement into the resin layer 69.

A horizontally disposed roll 74 of pliable film is supported above forward flight 61 of continuous belt 56 and is adapted to be rotated and pay out the film 75 in a uniform and continuous manner on top of the resin layer 69. A pair of vertically spaced feed rolls 76 and 77, engage the film 75 and feed it downwardly beneath a resin hopper 78, a doctor roll 79 and a third feed roll 80, whereby it is laid upon the top of the resin layer 69. The resin hopper 78 contains a supply of resin which is fed upon the top surface of film 75 by means of feed orifices (not shown) and spread to a uniform and carefully controlled thickness by means of the doctor roll 79. As previously mentioned, when a thixotropic resin is employed, a heating means for partial gelation of the resin may or may not be required. However, when employing a liquid resin, a precuring unit such as that described in FIG. 1 will be utilized.

Thus the machine 55 is adapted to provide a resin lay up having thin films of pure resin covering each of its surfaces, and having a chopped strand reinforcement incorporated therein. The type of product built by the embodiment of FIG. 2 is shown in the section view of FIG. 3, wherein a bottom pliable film 60 supports a thin layer of pure resin 66, the interlayer of resin 69, and fibrous reinforcement 71, a top layer of pure resin 80, and a top cover film 75.

A third embodiment of the present invention is shown in FIG. 4 wherein apparatus is illustrated which is adapted to apply a thin film of unfilled, liquid resin to each of the surfaces of a panel, as compared to the application of thixotropic resin, as described in the embodiment of FIG. 2. The numeral 82 designates the machine generally, which is of the continuous production type. The continuous conveyor belt is designated by numeral 83 and has forward and reverse flights 84 and 85. The support rolls for the belt are indicated by numerals 86 and 87. At 88 a roll of pliable film is supported upon an axis parallel to the axes of conveyor rolls 86 and 87 in a manner whereby the film 89 can be payed out and smoothly laid against a portion of the rear flight 85 of belt 83. A gripper roll 90 is positioned transversely of and behind the rear flight 85 of belt 83 and a doctor roll 91 is positioned upon the opposite side of flight 85. Doctor roll 91 has a resin tank 92 positioned thereunder and adapted to contain a supply body of liquid resin to a sufficient depth whereby the doctor roll is partially immersed therein. As the film 89 moves over roll 91 it is coated with a thin film 93 of the liquid resin, the thickness of the film being controlled by a doctor knife 94 (not shown), having its edge positioned in close proximity to the periphery of doctor roll 91. The film 89 is caused to follow around the belt support roll 86 and upon the forward flight 84 of belt 83 in a smooth and continuous manner. At 95 a bank of heaters is positioned so that the individual units 96 thereof are faced upwardly to radiate toward the resin layer 93 and thereby partially gel the resin to a sufficiently firm state that it will not intermix with the subsequently applied resin interlayer which is applied on the forward flight 84 of belt 83.

A resin hopper 97 is shown at the forward end of flight 84 of belt 83 followed by a gauge roll 98 and chopped fiber distribution unit 99. A roll 100 of top cover film 101 is supported above forward flight 84 of belt 83 and is adapted to be rotated and pay out the film in a uniform and continuous manner on top of the resin layer 102. A pair of vertically spaced feed rolls 103 and 104, engage the film 101 and feed it horizontally above belt 83, through a heating zone 105, located between gripper roll 106 and feed roll 107, and down to a lay down roll 108 for positioning upon top of resin interlayer 102. A doctor roll 109 is cooperatively associated with a doctor knife 110 which is adapted to provide a thin and even film 111 from a hopper 109a of liquid resin on one side of film 101. Gripper roll 106 is positioned opposite doctor roll 109 for feeding film 101 forwardly in a smooth manner. A bank of radiant heaters 112 is disposed above film 101 and the units 113 thereof are adapted to radiate downwardly upon film 101 and its resin layer 111 to thereby gel the resin to a sufficiently firm state to limit intermixture of film 111 with the resin interlayer 102. Completion of the wet resin lay up is effected in the manner described for the previously described embodiments of the invention as shown in FIGS. 1 and 2.

The following examples illustrate the application of the present invention to the production of synthetic resin panels comprising various combinations of resins, thixotropic agents, catalysts, methods of lamination, etc.

*Example I*

A laboratory run was made wherein a thixotropic resin mix was made as follows:

| | Parts |
|---|---|
| Polyester resins | 100 |
| Santocel "C" [1] | 10 |

[1] A light weight porous silica gel from which the water has been removed by a process that does not destroy the original gel structure. Apparent density 7.5 pounds per cubic foot; bulking value in liquid, 17.1 pounds per gallon.

The resin mixture was coated onto a cellulose film by means of a hand roll and the coated film was then air dried over night at room temperature. Laminates were made the following day employing the resin coated film. The dried resin coated film could be rolled and stored without affecting the adhesion of the resin film to the cellophane. Laminates were made employing the coated film as follows: The coated film was laid down upon a smooth lay up surface. A layer of polyester resin-styrene blend having a catalyst incorporated therein was then flowed onto the cellulose film in a uniform layer approximately 1/16" in thickness. A random glass fiber mat was then incorporated into the resin layer. A second coated film of cellophane was applied over the resin layer. The wet lay up so formed was squeegeed to remove occluded air and cut into appropriately shaped sections. The cut sections were cured between heated mold plates to convert the resin to a hard solid state.

After the curing operation was completed the cellulose films were stripped from the resin and the layer of resin previously applied to the cover film was found to have become molecularly bonded to the laminate during curing and the cellulose film released therefrom readily after the cure was complete.

*Example II*

A run was made on production equipment comprising an angle iron framework on which was mounted an aluminum roller over which was adjustably positioned a steel doctor knife. The following thixotropic resin mix was employed:

| | Parts |
|---|---|
| Flexible polyester resin [1] | 30 |
| Rigid polyester resin [2] | 70 |
| Santocel "C" [3] | 10 |
| Selectron 5665 Red Pigment [4] | 0.5 |
| Cobalt naphthenate (6% metal) | 0.006 |
| Benzoyl peroxide | 1 |
| Lupersol DDM [5] | 0.25 |

[1] Plaskon 9600 polyester resin.
[2] Plaskon 9404 polyester resin.
[3] A light weight porous silica gel from which the water has been removed by a process that does not destroy the original gel structure. Apparent density 7.5 pounds per cubic foot; bulking value in liquid, 17.1 pounds per gallon.
[4] A standard paste pigment weighing 10.29 pounds per gallon, manufactured by Pittsburgh Plate Glass Company.
[5] A liquid catalyst consisting of 60% methyl-ethyl-ketone peroxide in dibutylphthalate.

A film of cellophane was drawn between the doctor knife and the aluminum roll, held stationary, as the thixotropic resin mix was buttered onto the film ahead of the doctor knife, manually. The coating of thixotropic resin was extruded on top of the cellulose film after which the coated film was passed beneath a battery of four 2500 watt Chromalox infrared heaters to dry the thixotropic film and then was wrapped around a roll to change its direction as it became part of the laminate.

The coated cellophane film was employed to form laminates in the manner described in Example I. The interlayer was colorless, providing a finished panel product having a red coating upon a colorless core and the physical appearance of the panel was that of a uniformly red colored sheet. When the curing operation was complete, the cover films readily stripped from the hardened panels and the thin films of resin which had been applied to the cover films were found to have molecularly bonded to the resin interlayer to provide an integral panel unit.

*Example III*

A coated cellophane film was made employing the equipment and resin mixture described in Example II. The coated film was employed in combination with a white pigmented resin interlayer to form laminates having a red coating upon a white core. The product was red in color but displayed a translucent quality by virtue of the white pigment contained in the core stock. When the curing operation was complete, the cover films readily stripped from the hardened panels and the thin films of thixotropic resin which had been applied to the covering films were found to have molecularly bonded to the resin interlayer to provide an integral panel unit.

The physical appearance of the panel was red in color but displayed a translucent quality by virtue of the white pigment contained in the white core stock.

*Example IV*

Runs were made in accordance with the process and apparatus of Example II wherein (*a*) a clear thixotropic coating was applied to a tinted interlayer of deep yellow color and (*b*) a deep yellow colored thixotropic coating was applied to a clear interlayer; thus the two finished products conveyed the same color impression. The resin formulae for the thixotropic mixes were as follows:

| Ingredient | Run I/Parts | Run II/Parts |
|---|---|---|
| Flexible polyester resin | 30 | 30. |
| Rigid polyester resin | 70 | 70. |
| Santocel "54" [1] | 10 | 10. |
| Cobalt Naphthenate (6% metal) | 0.006 | 0.006. |
| Benzoyl Peroxide | 1 | 1. |
| Lupersol DDM | 1/8 | 1/8. |
| Pigment [2] | None | Less than one. |
| Color | Clear | Deep Yellow. |

[1] A grade of dried silica gel containing substantially no lumps.
[2] Pigment was comprised of IC-419 white paste, 1 part; Selectron 5518 yellow paste, 2 parts. (IC-419 white paste is a pigment concentrate manufactured by Interchemical Corporation, Cincinnati, Ohio, consisting of approximately 60% solids of titanium dioxide ground into a reactive vehicle, probably IC-118 grinding vehicle; and Selectron 5518 yellow paste is a pigment paste concentrate manufactured by The Pittsburgh Plate Glass Company.)

*Example V*

A run was made employing a non-thixotropic resin mix having a viscosity of approximately 800 centipoises. The resin mix was of the following formulation:

| | Parts |
|---|---|
| Rigid polyester resin [1] | 95 |
| Styrene | 5 |
| Cobalt naphthenate (6% metal) | 0.009 |
| Benzoyl peroxide | 1.0 |
| Pigment [2] | 10 |
| Lupersol DDM | 1 |

[1] Plaskon PE-22 polyester resin.
[2] Selectron 5518 (a yellow paste pigment concentrate manufactured by the Pittsburgh Plate Glass Company).

The resin mix was coated onto a thin cover film of pliable cellophane and was partially gelled to a firm state by an application of heat. Laminates were then made and cured, employing the resin coated film, in the manner described in Example I. When the curing operation was complete, the cover films readily stripped from the hardened panels and the thin films of resin which had been applied to the cover films were found to have molecularly bonded to the resin interlayer to provide an integral panel unit.

*Example VI*

A run was made wherein a non-thixotropic resin mix having a viscosity of approximately 2000 centipoises was employed. The resin mix was of the following formulation:

| | Parts |
|---|---|
| Rigid polyester resin [1] | 100 |
| Styrene | 1 |
| Cobalt naphthenate (6% metal) | 0.009 |
| Benzoyl peroxide | 1.0 |
| Pigment [2] | 10 |
| Lupersol DDM | 1 |

[1] Plaskon PE-22 polyester resin.
[2] Selectron 5518 (a yellow paste pigment concentrate manufactured by the Pittsburgh Plate Glass Company).

The resin mix was coated onto a thin cover film of pliable cellophane and was partially gelled to a firm state by an application of heat. Laminates were then made and cured, employing the resin coated film, in the manner described in Example I. When the curing operation was complete, the cover films readily stripped from the hardened panels and the thin films of resin which had been applied to the cover films were found to have molecularly bonded to the resin interlayer to provide an integral panel unit.

Thixotropic materials applicable to use in the present invention include the commercially available silica gels including (*a*) Santocel "C," Monsanto Chemical Co.; (*b*) Santocel "54," Monsanto Chemical Co.; (*c*) Cab-O-Sil, Godfrey L. Cabot, Inc.; (*d*) Metro-Nite BXXX, Metro-Nite Co., Milwaukee, Wisconsin; (*e*) Valron Estersil, E. I. du Pont Co.

*Resins.*—The thermosetting resins employed may include various thermosetting materials such as the polyesters and polyester-styrene blends, melamine and alkyd and alkyd silicone resins and variations of the synthetic thermosetting materials which may be made by one skilled in the art to produce a resin originally in a liquid state which is capable of polymerization to a hard, strong, solid mass.

While it is not the purpose to limit the scope of the present invention by the viscosity of the resin applied to the cover films, it may be stated that thixotropic resins have viscosity values in the range of 50,000 centipoises up; highly viscous liquid resins fall in a viscosity range from about 10,000 centipoises up to about 25,000 and the less viscous liquid resins fall within the range up to about 100 to 10,000 centipoises.

Film thicknesses of either thixotropic or liquid resin in the range from about .007 to .023 inch have been successfully applied by the present invention and where desired it is to be considered that the films outside of these thicknesses may also be applied. Those of a thickness in the range below about .010″ but above .0030 will generally be found desirable inasmuch as they provide good erosion protection at a minimum cost. Where, as was shown in Example II(a), it was desired to make a colored panel stock by applying a colored resin layer to a colorless core, the heavier coatings may be desirable in order to provide the correct shade or coloring to the panel.

In addition to thixotropic and lower viscosity liquid resins, the so-called "hot melt" resins may be applied to the cover films to provide the protective coatings of the present invention. For example, a polyester resin which is solid at room temperature, such as Laminac 4171, manufactured by the American Cyanamid Company, could be brought to a fluid coating viscosity by the application of heat in the coater. As soon as the coated film leaves the coater and the coating is chilled, it reverts to a sticky consistency. An appropriate inert atmosphere such as nitrogen or carbon dioxide gas may be required around the heated resin to prevent premature curing. Laminates are then made employing the coated film in combination with an appropriate liquid thermosetting synthetic resin interlayer.

*Catalysts.*—If desired various catalysts may be used to aid in curing the resin, and for this purpose organic peroxide catalysts such as methyl ethyl ketone peroxide, benzoyl peroxide, tertiary butyl perbenzoate and the like are quite satisfactory. If desired, various promoters or accelerators known to the art, such as the mercaptans or cobalt naphthenate may be used.

*Dyes.*—Dyes or pigments of the relatively light fast type which are not affected by the other components of the resin formulation may be employed to impart desired colors either to the resin interlayer and/or to the resin films applied to the surfaces of the interlayer.

*Reinforcement agents.*—Where the panels made in accordance with the present invention are to be employed in awnings or similar applications where it is desired that the products be translucent, a reinforcement material consisting essentially of glass in the form of fibers, floc, random mat, or woven cloth may be incorporated in the liquid resin. Such reinforcement materials are especially adapted to the present process and product by virtue of their high strength-weight ratio. However, other reinforcing materials such as chopped synthetic fibers of rayon, nylon, etc., and certain of the vegetable fibers such as cotton jute, hemp and the like may be used. Of course the reinforcement materials must not be soluble in the components of the resin interlayer.

*Shaping and molds.*—Panels made in accordance with the present invention may be shaped and hardened in a known manner. For producing corrugated panels, a corrugated lower mold is employed. An upper mold is not generally required, but if desired, an aluminum or other light weight, heat conducting cover sheet may be applied over the resin lay up during the curing operation.

*Curing temperatures.*—Temperatures for curing the resin interlayer in the range from about 90° F. to about 275° F. will generally be satisfactory. Curing times from about 2 minutes to about 24 hours or longer may be employed. For commercial expediency, cure times in the range from about 15 minutes to not more than 2 hours are desirable.

*Cover films.*—Films applicable to use in the present invention include those formed of regenerated cellulose (known in the trade as cellophane), cellulose acetate, polyvinyl chloride, vinyl butyral, polyethylene and others, including, if desired, thin films of metal, which are inert with respect to the ingredients contained in the resin and which will strip readily from the surfaces of the cured panels.

When a thixotropic or very viscous resin is applied in film form on top of the resin impregnated and reinforced core without advancing the cure of the thixotropic or viscous resin film, there results a certain amount of diffusion of the thicker resin into the thinner resin of the core, and vice versa. If, however, the thixotropic or viscous resin is pregelled slightly to the point where it does not diffuse easily, such dilution or mixing of resins does not occur. I have taken advantage of this process to produce either panels with a solid color surface or panels with highly decorative surfaces depending upon whether the thixotropic or viscous material is advanced in cure. For example, I have impregnated the reinforcing core stock with a white pigmented resin, and then used a red pigmented thixotropic resin applied to the pliable film and subsequently bonded to the core material. Some of the red material diffuses into the white, and some of the white coated reinforcing material shows through the red overlay film to produce a very decorative and pleasing surface.

With the same conditions as outlined in the above paragraph, but by advancing the cure of the red pigmented thick resin on the pliable film before bonding to the core stock, I am able to produce a panel which is solid red in appearance on the surface, but which is white on the underside. The fibers do not show through in a pronounced manner as when no gelation of the thixotropic film occurs.

Such a two-tone product or combination of colors can be very useful in the awning and patio roofing business wherein it is desirable to use translucent panels for light transmission but where it is not desirable to have a strong color transmitted to the interior of the room being protected by the awning or patio roof. For example, a red awning might be very beautiful for the exterior of a house, but red light transmitted through a translucent reinforced panel might be very objectionable to the color scheme of the interior. Such a condition would occur when a translucent panel which is red throughout is used as the awning or patio roof.

By using the process of the present invention, it is possible to use a translucent white core stock and a red translucent thixotropic or viscous film of resin on the surface, combining and curing in the manner prescribed above to produce a two-tone awning which is red when viewed on the outside, and nearly white when viewed from the inside. The white translucent core stock reduces the transmission of red light through the awning to such an extent that it no longer becomes a problem when the interior color scheme does not call for or blend with a red light.

Another discovery and advantage of the present invention is the production of translucent panels with far greater uniformity of color distribution when the panel is viewed through transmitted light. By using a clear resin for the core stock and by pigmenting either one or both surfaces of the thixotropic or viscous resin to the desired degree of light transmission, and by spreading this pigmented surface resin in an even film of the desired thickness, I have been able to produce panels with marked improvement in color distribution. In older processes, the pigmented resin was used throughout the reinforcing core. Manufacturing difficulties in producing reinforcing cores of uniform thickness and reinforcement distribution, particularly in the case of random chopped fibrous glass, resulted in areas of reinforcement distribution in which the amount of glass varied from spot to spot as much as 25% or more. Such variation in the reinforcement causes a filtering action by the pigments in the resins, to different degrees and results also in different ratios of glass content to resin content from spot to spot. In very lightly tinted panels, the effect is not very noticeable; but as the tint is increased, the effect becomes very noticeable in the form of blotchiness. By using a colorless resin to impregnate the reinforcement, there is no filtering action; and by using a carefully controlled pigmented film of resin which is then bonded to the core in the above prescribed manner, a very uniform appearance is obtained which was not possible in the older process.

In the above discussions, reference has been made to thixotropic resin or highly viscous resins which are used in the process either in the "as applied" form or by slightly advancing the cure or gelation. I have also found that standard viscosity resins can be used providing the cure is very appreciably advanced to a firm or extremely tacky gel stage. In the latter case, the use of thixotropic agents may be avoided.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. A process of forming a fiber reinforced resin panel, comprising moving a continuous film along a predetermined path while forming a substantially uniform layer of liquid resin on said film, submerging fibrous reinforcement into the layer of liquid resin, moving a second film along another predetermined path while depositing a layer of resin on a surface of said film, advancing the cure of the resin on said second film, forming a composite resin layer by bringing the coated side of the second film into contact with the surface of the fiber containing layer of liquid resin while continuing to move each of said films along their respective predetermined paths, and then curing the composite resin layer.

2. A process of forming a fiber reinforced resin panel, comprising moving upper and lower continuous films along predetermined paths, coating each of said films with a layer of resin, advancing the cure of the coating of resin on each of said films, depositing a layer of liquid resin on the coated surface of the lowermost film, incorporating fibrous reinforcement into said layer of liquid resin, bringing the coated surface of the uppermost film into contact with the surface of reinforced layer of liquid resin to form a laminate, and then curing said laminate.

3. A process of forming a fiber reinforced resin panel, comprising advancing a continuous film along a predetermined path, coating a surface of said film with a thermosetting resin, advancing the cure of said resin, depositing a layer of liquid resin on said coating, incorporating fibrous reinforcement into said layer of liquid resin, depositing a second film onto the surface of the fiber reinforced layer of resin, and then curing the resins.

4. A process of forming a fiber reinforced resin panel as defined in claim 3, wherein prior to bringing the second film into contact with the surface of the fiber reinforced layer of resin a coating of thermosetting resin is deposited on said film, and the cure of said latter coating of resin is advanced prior to the contacting thereof with the fiber reinforced layer of resin.

5. Apparatus for continuously forming a fiber reinforced resin panel, comprising means for moving a first continuous film along a predetermined path, resin supply means positioned along said path for depositing a layer of liquid resin on said film, reinforcement supply means beyond said resin supply means for depositing fibrous reinforcement onto the surface of the layer of resin, means for moving a second continuous film along another predetermined path and into contact with the liquid resin carried by said first film at a predetermined point in the path of travel of said first film beyond said reinforcement supply means, depositing means positioned along the path of travel of said second film ahead of said predetermined point for depositing a relatively thin layer of thermosetting resin on the surface of said second film, means to gel said thin layer while on said second film ahead of said predetermined point, which gelled layer contacts the fiber reinforced layer of resin.

6. Apparatus for continuously forming a fiber reinforced resin panel, comprising means for moving a first continuous film along a predetermined path, coating means along said path for depositing a coating of heat curable resin on said film, heating means along the path of travel of said film for advancing the cure of the coating, supply means along said path for forming a layer of liquid resin on the coated surface of said film, reinforcement depositing means for depositing fibrous reinforcement onto the surface of the layer of resin, means for submerging the fibrous reinforcement in said layer of resin, and means for continuously applying a continuous film to the surface of the reinforced layer of resin.

7. Apparatus for continuously forming a fiber reinforced resin panel, comprising means for moving a first continuous film along a predetermined path, resin supply means positioned along said path for depositing a layer of liquid resin on said film, reinforcement supply means beyond said resin supply means for depositing fibrous reinforcement onto the surface of the layer of resin, means for moving a second continuous film along another predetermined path and into contact with the liquid resin carried by said first film at a predetermined point in the path of travel of said first film beyond said reinforcement supply means, depositing means positioned along the path of travel of said second film ahead of said predetermined point for depositing a relatively thin layer of thermosetting resin on the surface of said second film, heating means disposed along the path of travel of the second film intermediate said predetermined point and said depositing means for advancing the cure of said thermosetting resin on the second film, and said layer in the stage of advanced cure being contacted with the fiber reinforced layer of resin.

8. Apparatus for continuously forming a fibrous reinforced resin panel, comprising means for moving a first continuous film along a predetermined path, resin supply means positioned along said path for depositing a layer of liquid resin on said film, depositing means positioned along the path of travel of said first film ahead of the liquid resin supply means for depositing a relatively thin layer of thermosetting resin on said first film, heating means positioned intermediate said depositing means and said liquid resin supply means for advancing the cure of the thermosetting resin on said film prior to the depositing of the liquid resin thereupon, reinforcement supply means beyond said liquid resin supply means for depositing fibrous reinforcement upon the surface of the layer of liquid resin, means for moving a second continuous film along another predetermined path and into contact with the liquid resin carried by said first film at a predetermined point in the path of travel of said first film beyond said reinforcement supply means, depositing means positioned along the path of travel of said second film ahead of said predetermined point for depositing a relatively thin layer of thermosetting resin on the surface of said second film, which thin layer contacts the fiber reinforced layer of resin.

9. A method for forming a substantially rigid fibrous reinforced resin panel, having a resin-rich surface, comprising placing in contact with one another a first layer of liquid thermosetting resin having a fibrous reinforcing material embedded therein and a thinner surface layer of uncured resin having a higher viscosity than the viscosity of the liquid thermosetting resin, at least one of said layers having a coloring agent therein, said surface layer having the higher viscosity being formed by depositing the resin in layer form on a film and heating the layer of resin on the film thereby to increase the viscosity of the layer and to advance the cure thereof prior to its being placed in contact with the resin layer having the reinforcing fibers therein.

10. A method of forming a fibrous reinforced synthetic resin panel having a resin-rich surface, comprising placing in contact with one another a liquid layer of uncured thermosetting synthetic resin having fibrous reinforcing material embedded therein and a much thinner surface layer of uncured unreinforced thermosetting synthetic resin having a higher viscosity than said first layer, said higher viscosity resin preventing the fibrous reinforcing material from projecting through said second layer or appreciably into said second layer prior to curing, and simultaneously heating said layers of resin while in contact with one another to cure said layers and bond them to one another and to contain the fibers beneath the second layer.

11. A method of forming a fibrous reinforced synthetic resin panel having a resin-rich surface, comprising placing in contact with one another a liquid layer of uncured thermosetting synthetic resin having fibrous reinforcing material embedded therein and a much thinner surface layer of uncured unreinforced thermosetting resin containing a pigment and gelled to a consistency sufficient to prevent any substantial diffusion between the resin layers, and said second surface layer having a higher viscosity than said first layer, and simultaneously heating said layers of synthetic resin while in contact with one another to cure said layers and bond them to each other and to contain the fibers beneath the second layer.

12. A method for forming a substantially rigid fibrous reinforced synthetic resin panel having a resin-rich surface, comprising placing in contact with one another a first layer of liquid thermosetting synthetic resin having fibrous reinforcing material embedded therein and a thinner surface layer of uncured, unreinforced, synthetic resin, at least one of said layers having a coloring agent therein and said thinner surface layer having a viscosity sufficiently higher than the viscosity of the layer of synthetic resin having the fibrous material embedded therein to prevent substantially diffusion between said layers and to contain the fibrous reinforcement beneath the thinner layer, and heating said layers of synthetic resin while in contact with one another to cure and bond the layers to one another.

13. The method as recited in claim 12, wherein the thinner surface layer has a thixotropic agent therein.

14. The method as recited in claim 12, wherein the thinner surface layer contains a coloring agent and has a viscosity greater than about 50,000 centipoises.

References Cited in the file of this patent

UNITED STATES PATENTS

| | | |
|---|---|---|
| 1,730,065 | Fischer | Oct. 1, 1929 |
| 2,061,203 | Merritt | Nov. 17, 1936 |
| 2,135,152 | Fischer | Oct. 4, 1938 |
| 2,206,441 | Winkelmann et al. | July 2, 1940 |
| 2,275,989 | Perry | Mar. 10, 1942 |
| 2,432,752 | Gray | Dec. 16, 1947 |
| 2,451,410 | Queeny | Oct. 12, 1948 |
| 2,495,640 | Muskat | Jan. 24, 1950 |
| 2,496,911 | Green | Feb. 7, 1950 |
| 2,500,728 | Williams | Mar. 14, 1950 |
| 2,523,410 | Allard | Sept. 26, 1950 |
| 2,525,864 | Carter | Oct. 17, 1950 |
| 2,526,945 | Gray | Oct. 24, 1950 |
| 2,528,152 | Landgraf | Oct. 31, 1950 |
| 2,528,168 | Paulsen | Oct. 31, 1950 |
| 2,541,297 | Sampson et al. | Feb. 13, 1951 |
| 2,541,896 | Vasileff et al. | Feb. 13, 1951 |
| 2,542,819 | Kropa | Feb. 20, 1951 |
| 2,561,449 | Ruderman | July 24, 1951 |
| 2,577,205 | Meyer et al. | Dec. 4, 1951 |
| 2,596,162 | Muskat | May 13, 1952 |
| 2,605,205 | Patterson et al. | July 29, 1952 |
| 2,614,955 | Halsall | Oct. 21, 1952 |
| 2,645,626 | Nordlander et al. | July 14, 1953 |
| 2,668,789 | Phreaner | Feb. 9, 1954 |
| 2,673,826 | Ness | Mar. 30, 1954 |
| 2,688,580 | Fingerhut | Sept. 7, 1954 |
| 2,695,256 | De Olloqui et al. | Nov. 23, 1954 |
| 2,769,742 | Helbing | Nov. 6, 1956 |
| 2,784,763 | Shorts | Mar. 12, 1957 |
| 2,805,181 | Groff et al. | Sept. 3, 1957 |

FOREIGN PATENTS

| | | |
|---|---|---|
| 151,104 | Australia | Apr. 27, 1953 |
| 711,050 | Great Britain | June 23, 1954 |

OTHER REFERENCES

"Organic Coating Technology," Payne; vol. 1; 1954; John Wiley and Sons, New York; page 603.